(12) United States Patent  (10) Patent No.: US 8,668,260 B2
Kiilunen  (45) Date of Patent: Mar. 11, 2014

(54) BICYCLE SEAT ASSEMBLY

(76) Inventor: Peter Kiilunen, Milford, MI (US)

( * ) Notice: Subject to any disclaimer, the term of this patent is extended or adjusted under 35 U.S.C. 154(b) by 0 days.

(21) Appl. No.: 13/600,449

(22) Filed: Aug. 31, 2012

(65) Prior Publication Data

US 2013/0082493 A1  Apr. 4, 2013

Related U.S. Application Data

(60) Provisional application No. 61/542,376, filed on Oct. 3, 2011.

(51) Int. Cl.
*B60N 2/40* (2006.01)
*B62J 1/00* (2006.01)

(52) U.S. Cl.
USPC .................................. 297/195.1; 297/215.14

(58) Field of Classification Search
USPC ........ 297/195.12, 195.13, 243, 195.1, 215.14
See application file for complete search history.

(56) References Cited

U.S. PATENT DOCUMENTS

| 643,373 | A | * | 2/1900 | Gabriel ......................... 224/415 |
| 810,814 | A | * | 1/1906 | Santini ..................... 297/195.12 |
| 924,541 | A | * | 6/1909 | Duck ............................. 280/202 |
| 2,320,344 | A | * | 6/1943 | Belanger ...................... 280/202 |
| 3,531,138 | A | * | 9/1970 | Sorensen ..................... 280/291 |
| 3,873,127 | A | * | 3/1975 | McNichol et al. ............ 280/202 |
| 6,616,224 | B2 | * | 9/2003 | Tsuge ...................... 297/195.12 |
| 8,309,233 | B2 | * | 11/2012 | Facchini et al. ............... 428/679 |

* cited by examiner

*Primary Examiner* — Sarah B McPartlin
(74) *Attorney, Agent, or Firm* — Gifford, Krass, Sprinkle, Anderson & Citkowski, P.C.

(57) ABSTRACT

A bicycle seat assembly for use in conjunction with a bicycle having a frame, a front and rear wheel, and a seat post extending generally vertically upwardly in the frame between the front and rear wheel. The bicycle seat assembly includes a seat having at least one elongated strut extending between the seat and the bicycle frame around the rear wheel axis of the vehicle. A second elongated strut extends between the seat post and the seat so that the seat is positioned generally vertically above the rear wheel axle.

7 Claims, 2 Drawing Sheets

BICYCLE SEAT ASSEMBLY

CROSS REFERENCE TO RELATED APPLICATIONS

This application claims priority of U.S. Provisional Application 61/542,376, filed Oct. 3, 2011, the contents of which are incorporated herein by reference.

BACKGROUND OF THE INVENTION

I. Field of the Invention

The present invention relates generally to bicycle seat assemblies.

II. Description of Related Art

Most modern-day bicycles include a frame having a front wheel mounted to the front fork and a rear wheel rotatably mounted to the rear of the frame. These frames typically include a center seat post which extends generally vertically at a position in between the front and rear wheels. A seat is then mounted on top of the seat post.

In order to propel the bicycle, a pedal assembly is also rotatably mounted to the frame closely adjacent the bottom of the seat post. An elongated endless chain then drivingly connects the pedal assembly to the rear wheel, typically via sprockets, and in many cases to a transmission mounted on the rear wheel and/or pedal assembly.

One disadvantage of these previously known bicycles, however, is that the seat must be mounted low enough on the seat post so that, when the bicycle is stopped, the bicycle rider can engage the ground with both of his or her feet. However, in doing so, the seat is mounted so low that full extension of the bicycle rider's legs is not possible while pedaling. The inability to achieve full leg extension while pedaling is particularly disadvantageous for persons who are slightly physically impaired, e.g. persons who have undergone knee or hip replacement surgery.

A still further disadvantage of the previously known bicycles which mount the seat on top of the seat post is that it is necessary to mount the bicycle from one side or the other of the frame. This, in turn, requires that the bicycle rider extend his or her legs over the center of the frame. While this may be easy for young people to achieve, such mounting of the bicycle becomes much more difficult with age.

SUMMARY OF THE PRESENT INVENTION

The present invention provides a bicycle seat assembly which overcomes the above-mentioned disadvantages of the previously known bicycle seat assemblies.

In brief, the bicycle seat assembly of the present invention utilizes a standard bicycle frame having a front fork mounted to the front of the frame and to which the front wheel is rotatably mounted. Similarly, a rear wheel is rotatably mounted to the rear of the frame while a pedal assembly is rotatably mounted to the frame and drivingly connected to the rear wheel.

A generally vertically extending seat post forms the part of the frame in between the front and the rear wheels. The seat post is made of a rigid material, such as metal.

A first elongated strut is connected to the frame adjacent the axis of rotation of the rear wheel. This elongated strut extends upwardly from the axis of the rear wheel to a position above the rear wheel and preferably below the top of the seat post. A bicycle seat is then secured to the elongated strut so that the bicycle seat is positioned above the axis of rotation of the rear wheel and preferably lower than the top of the seat post.

In order to prevent rotation of the seat with its attached strut around the axis of rotation of the rear wheel, a second elongated strut extends between the seat post and the seat. This second elongated strut locks the angular position of the struts relative to the axis of rotation of the rear wheel, and thus locks the position of the seat relative to the frame.

In use, because the seat is positioned rearwardly of its normal position above the seat post a bicycle rider may mount the bicycle seat simply by walking onto the bicycle seat from the rear of the bicycle. Furthermore, since the bicycle seat is positioned more rearwardly than the prior art bicycles, full extension of the legs while pedaling is achieved.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF THE INVENTION

Figure 1:
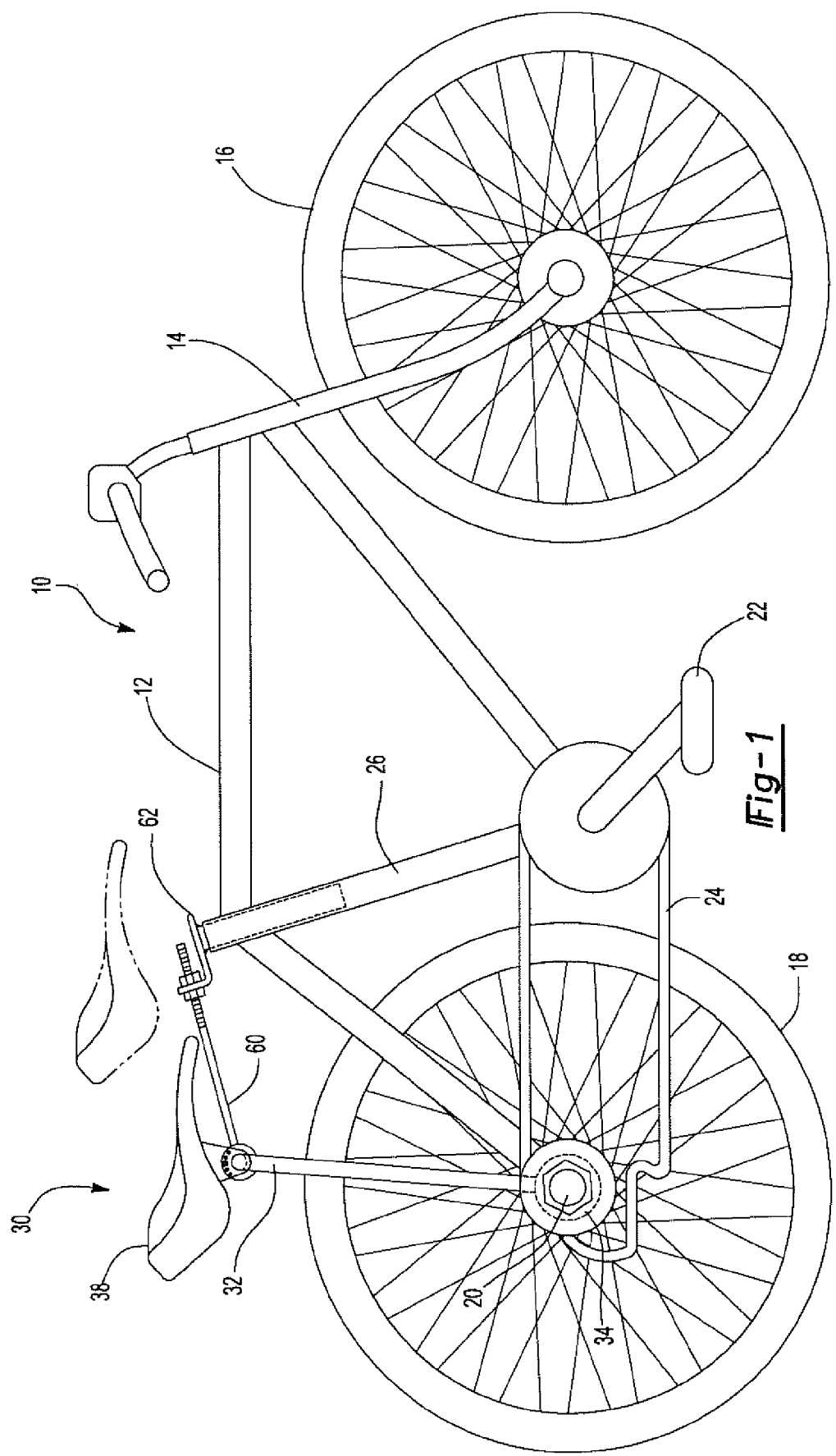
FIG. 1 is a side view illustrating a preferred embodiment of the present invention.

With reference first to FIG. 1, a bicycle 10 is shown having a frame 12 which is typically made from metal tubing. A front fork 14 is pivotally mounted to the frame 12 while a front wheel 16 is rotatably mounted to the bottom of the fork 14 in any conventional fashion.

A rear wheel 18 is also rotatably mounted to the frame 12 but at the rear of the frame 12. The rear wheel 18 is rotatable about an axis of rotation 20 which also extends through openings formed in the rear of the bicycle frame 12.

Any conventional means may be utilized to propel the bicycle 10. However, as shown, a pedal assembly 22 is drivingly connected to the rear wheel 18 by any conventional mechanism, such as a chain 24. Consequently, rotation of the pedals drives the chain 24 which, in turn, drives the rear wheel 18. The pedal mechanism and drive chain 24 may also include one or more transmissions (not shown) for the chain to vary the rotation ratio of the pedal 22 relative to the rear wheel 18.

The bicycle frame 12 also includes a seat post 26. This seat post 26 is typically constructed of rigid metal tubing and extends generally vertically in between the front wheel 16 and rear wheel 18.

Figure 2:
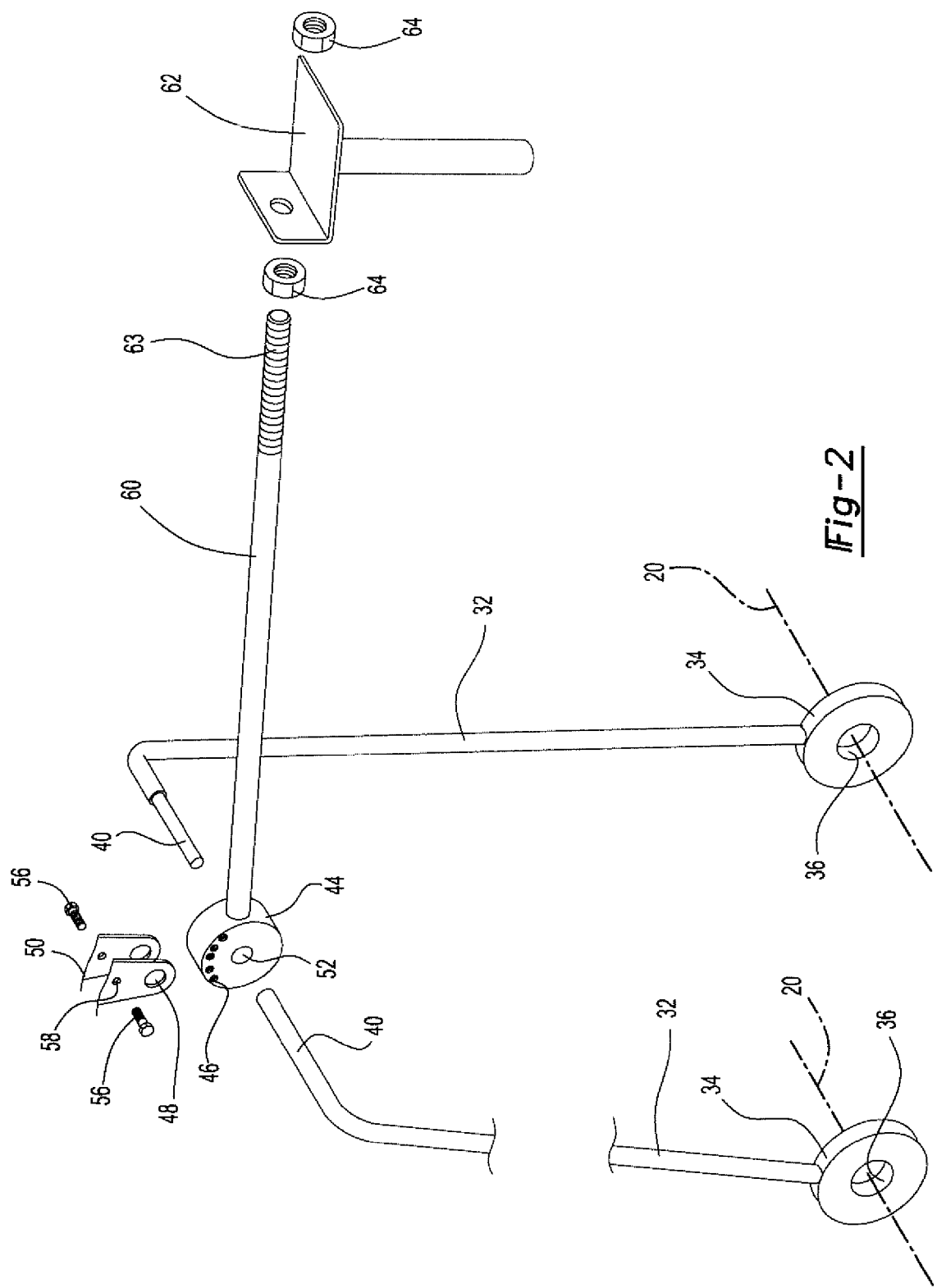
FIG. 2 is an exploded view illustrating a preferred embodiment of the present invention but with parts removed for clarity.

With reference now to FIGS. 1 and 2, a seat assembly 30 in accordance with the present invention is illustrated. The seat assembly 30 includes at least one, and preferably two elongated struts 32. The struts 32 preferably extend generally vertically on opposite sides of the rear wheel 18 and are secured to the bicycle frame 12 at their lower end. Although any conventional means may be used to secure the lower ends of the struts 32 to the bicycle frame 12, preferably the struts 32 each include a mounting plate 34 fixedly secured to the struts 32. These mounting plates 34 include an opening 36 which is coaxially aligned with the axis of rotation of the rear wheel 18. Any means, such as a nut, can be used to rigidly secure the mounting plates 34, and thus the struts 32, to the bicycle frame 12.

A bicycle seat 38 is mounted to the upper ends 40 of the struts 32 so that the bicycle seat 38 is positioned generally vertically above the axis of rotation 20 of the rear wheel 18. Although any conventional mechanism may be used to secure the bicycle seat 38 to the upper ends 40 of the struts 32, as shown, an upper mounting plate 44 is secured to the upper ends 40 of the strut 32 in any conventional fashion. However, as shown, the upper ends 40 of the struts 32 extend through openings 48 on a seat bracket 50 which is fixedly mounted to the bottom of the bicycle seat 38. These upper ends 40 then extend into an opening 52 formed in the mounting plate 44 to lock the struts 32, mounting plate 44, and seat bracket 50 to each other.

In order to lock the pivotal position of the bracket 50, and thus also of the seat 38, relative to the mounting plate 44, one or more bolts 56 extend through openings 58 in the seat bracket 50 and threadably engage internally threaded holes 46 in the mounting plate 44. Thus, when the seat is pivotally adjusted to the desired position, tightening of the bolts 56 locks the pivotal position of the seat bracket 50 relative to the mounting plate 44 against movement.

Referring again to both FIGS. 1 and 2, an elongated second strut 60 is constructed of a rigid material, such as metal, and extends in between the mounting plate 44 for the seat and a seat post bracket 62 mounted to the seat post 26. The free end 63 of the strut 60 is preferably externally threaded so that the effective length of the strut 60, i.e. the length between the seat post bracket 62 and the mounting plate 44, may be adjusted by adjusting the positions of a pair of nuts 64 along the threaded free end 63 of the strut 60.

With reference now to FIG. 1, the bicycle seat 38 is secured to the bicycle frame 12 as previously described so that the bicycle seat 38 is generally vertically aligned with the rear axis of rotation 20 of the rear wheel 18. Additionally, the seat 38 is preferably below the top of the seat post 26. This effectively lowers the position of the seat 38 and enables the seat to be easily mounted by simply walking onto the seat 38 from the rear of the bicycle 10. Furthermore, even though the bicycle seat 38 has been lowered from its normal position, illustrated in phantom line in FIG. 1, full extension can still be achieved during the pedaling of the bicycle since the bicycle seat 38 is effectively positioned further away from the pedal assembly 22 than in its original position.

From the foregoing, it can be seen that the present invention provides a simple yet effective bicycle seat assembly which can be easily mounted and still provides full extension of the cyclist's legs while pedaling. Having described my invention, however, many modifications thereto will become apparent to those skilled in the art to which it pertains without deviation from the spirit of the invention as defined by the scope of the appended claims.

I claim:

1. For use in conjunction with a bicycle having a frame, a front wheel, a rear wheel and a tubular seat post extending generally vertically upwardly in said frame between the front and rear wheels, a bicycle seat assembly comprising:
   a single seat for the bicycle,
   a pair of elongated support struts, each support strut having one end attached to said seat and the other end attached to the frame adjacent the axis of rotation of the rear wheel, said support struts supporting said seat above the rear wheel,
   a bracket insertable into said seat post,
   an elongated adjustment strut non adjustably attached at one end to said seat and at its other end to said bracket, said adjustment strut extending generally horizontally but sloping downwardly so that said seat is at least partially positioned below a top of the seat post, and
   an infinitely variable mechanism which varies a point of longitudinal attachment between said bracket and said adjustment strut to thereby vary the distance between said bracket and said seat.

2. The bicycle seat assembly as defined in claim 1 wherein said axis of rotation of the rear wheel extends through said other end of said first strut.

3. The bicycle seat assembly as defined in claim 1 wherein each of said pair of elongated support struts extending on opposite sides of the rear wheel.

4. The bicycle seat assembly as defined in claim 1 wherein said seat is substantially vertically aligned with the axis of rotation of the rear wheel.

5. The bicycle seat assembly as defined in claim 1 and comprising a mounting plate attached to the one end of at least one of said pair of support struts of said first strut.

6. The bicycle seat assembly as defined in claim 5 and comprising a seat bracket attached to said seat, said seat bracket being attachable to said mounting plate at at least two predefined pivotal positions.

7. The bicycle seat assembly as defined in claim 1 wherein said other end of said adjustment strut is threaded, and a nut which threadably secures said second strut to said bracket, where the distance between said bracket and said seat is adjustable by rotation of said nut.

* * * * *